United States Patent Office 3,166,533
Patented Jan. 19, 1965

3,166,533
METHOD FOR THE ADIABATIC PRODUCTION OF CASTINGS OF POLYCAPROLACTAM AND SIMILAR POLYAMIDES HAVING ANY REQUIRED SHAPE AND SIZE
Otto Wichterle, 2 Vaclavkova, Prague 6, Czechoslovakia; Jan Šebenda, 53 Bubenska, Prague 7, Czechoslovakia; and Jaroslav Králíček, 12 Taboritska, Prague 11, Czechoslovakia
No Drawing. Filed Dec. 16, 1959, Ser. No. 859,854
5 Claims. (Cl. 260—78)

The production of massive castings of molten polyamide is greatly complicated by the fact that the castings solidify in the inward direction from the cooled surface so that cavities such as hollows, bubbles, or recesses are formed in the internal molten parts due to their extraordinarily large contraction which is caused by the solidification of the material as well as by its transition to a crystalline form. From these reasons the congealed castings exhibit considerable internal stress which, either immediately after cooling or after a somewhat longer time, causes substantial deformations of the shape and in the case of large sized articles results even in their cracking. Castings free of those defects could be obtained only after extremely slow cooling, which brings about considerable difficulties in the practice. However, even in that case the product would possess an inferior quality because the extremely slow cooling results in the formation of large crystalline agglomerates (so-called "sphaerolites"), which causes a non-homogeneous structure deteriorating the mechanical properties of the article.

In the case of rod-like castings a method of gradual zonal cooling from the lower end of the rod towards the upper one has been proposed which may be eventually combined with a very slow zonal melting in the upward direction. However, this method can be applied only with rods having comparatively small diameters, the quality of the upper end of the article being defective even in this case. According to another method the manufacture of larger polyamide blocks is characterized by using a metal mould which, due to its considerable heat capacity, effects a very rapid cooling of the polyamide melt, which results in the instantaneous solidification of the casting. However, this method can be realized only by means of especially designed metal parts situated in the moulds and has not yet been employed in the production practice.

The invention now relates to a method for the production of castings of polycaprolactam and similar polyamides having any required shape and size, and being free of internal stress, by the rapid polymerization of appropriate monomers. The invention is realized by the polymerization of the starting mixture containing the monomer, polymerization catalysts and eventually inert fillers in a heat-insulated mould. The required initial polymerization temperature should be determined in advance experimentally; the temperature of the reaction mixture in the final polymerization stage should namely rise, due to polymerization heat evolved, to a value which does not exceed the softening or melting point of the resulting polymer. The initial temperature of the reacting material may vary, according to particular circumstances, in a range of maximum 95 to 215° C.

An alkali metal (sodium) salt of 6-caprolactam is added to the monomer together with a compound selected from the N-alkylimide series as the polymerization catalyst. Various substances such as acetylcaprolactam, caproylcaprolactam, diacetyl-ethylamine, dicaproyl butylamine, tetraacetyl-hexamethylenediamine, or styrene-methacryloylcaprolactam copolymer may serve as said compounds selected from the N-alkylimide series.

The present invention provides a technologically extremely simple method for the production of polyamide castings having any required shape and size which are free of internal stress. The method of this invention makes use of extraordinarily effective polymerization catalysts—N-alkylimides (e.g., acetylcaprolactam, diacetylbutylamine, dicaproylethylamine) in the presence of alkali metal salts of caprolactam; those catalysts render possible carrying out the polymerization of 6-caprolactam at a satisfactory reaction rate even at comparatively low temperatures so that the polymerization equilibrium can be achieved, or at least closely approximated, under practically adiabatic conditions. The polymerization process is nearly adiabatic especially in the case that thoroughly heat-insulated moulds having small heat capacity are used. However, the requirements of both careful insulation of the polymerization apparatus and its lowest possible heat capacity seem to be of the smaller importance, the faster proceeds the polymerization and the larger are castings so produced.

Another pre-condition necessary for obtaining satisfactory results is proper adjustment of the initial temperature of the material to be polymerized which should be chosen sufficiently low; the melting point, respectively softening point of the polyamide should not be namely exceeded after completing the practically adiabatic polymerization process. Under these conditions the polymerization yields immediately the solid polyamide; certain internal stress caused by cooling the polymeric product rapidly is only temporary, being fully compensated as soon as the temperature is levelled in the whole mass of the casting.

The polymerization of 6-caprolactam results in the evolution of such an amount of heat that the temperature of the polymerizing material rises by about 50–60° C. if the reaction conditions are adiabatic. Consequently, if the final temperature of the polymer during the polymerization process should not exceed its softening point, it is necessary to choose the initial temperature by at least 50–60° C. lower than is the softening point of the polymer, i.e. advantageously in a range of 150–160° C. The lower limit of this temperature range is determined by the limited solubility of the polyamide in monomeric 6-caprolactam. Polycaprolactam is known to exhibit, at a temperature of 150° C., only a limited solubility in the monomer; below this temperature the polymer separates from the polymerizing mixture in a powdered form if the polymerization is carried out isothermically. Consequently, this temperature constitutes the lowest possible initial polymerization temperature under isothermical reaction conditions. However, in the case of adiabatic polymerization the temperature of the polymerizing mixture rises gradually in the course of the polymerization, which results in increasing solubility of the formed polymer in the used monomer. This circumstance makes possible to elect the initial polymerization temperature at somewhat lower values than is the critical solubility limit, e.g., at a temperature of 130–135° C.

Since the final maximum polymerization temperature should not exceed the softening or melting point of the polyamide (e.g., a temperature of 220° C. in the case of polycaprolactam), the polymerization should be started at a temperature below 165° C. However, this is the case only if the polyamide articles produced in this way contain no fillers. A number of substances selected from the group consisting of powdered metals, metal oxides, pigments, graphite, abrasives, glass fibres, or metal fibres may serve as inert fillers for the polyamide material. If any fillers are used, the polymerization may be initiated at higher temperatures in accordance with the content of said fillers in the polyamide material and with their specific heat; these substances namely absorb certain amount of the reaction heat so that the temperature change under adiabatic polymerization conditions is lower than 60° C. In the case of articles having high content of fillers no troubles arise even if the melting point of the polyamide is exceeded, for the higher content of inert substances results in reduced volume contraction caused by crystallization of the polyamide, which is due to the lower polyamide content.

In further, the polymerization process according to the present invention provides a method for the production of polyamide articles with highest possible content of fillers; the manufacture of such articles by other methods for polymerizing caprolactam is considerably difficult. According to the present invention, the production of polyamide articles with high filler content is facilitated by low initial viscosity of the reaction mixture so that the mixture is able to fill up perfectly the whole space of the mould and easily penetrate into the interstices between the filler particles.

If certain polyfunctional imides such as styrene-methacryloyl-caprolactam polymers are used as polymerization catalysts, even such polyamides can be obtained which, despite of their amorphous character, have higher softening temperature than the above mentioned sharp melting point of typical linear polycaprolactam, which is due to considerable cross-linking of the linear polymer chains. In this case the polymerization can be initiated at an adequately higher temperature, which yields high quality massive castings as well.

It is in certain cases advantageous to maintain the whole surface of the casting mould during the polymerization process at a previously chosen constant temperature which may vary within a range of 150 to 285° C. The polymerization of the monomer may be carried out immediately in a mould having an appropriate shape corresponding to the final article (gear wheels, bearings, etc.). The moulds are either thin-walled, heat-insulated, or adapted for heating; in these the same temperature conditions can be maintained by proper temperature regulation as inside the polymerizing material, perfect homogenity of the article being ensured in this way. Alternatively, moulds heated to a constant temperature may be used, which is suitable mainly in the case of small-sized castings.

*Example 1*

8.5 g. of sodium salt of 6-caprolactam and 31.2 g. of N-acetyl-6-caprolactam were dissolved in 7.5 kg. of anhydrous 6-caprolactam preheated to a temperature of 145° C. The mixture was transferred into a cylindrical heated aluminium mould having a diameter of 20 cm. and a height of 60 cm., and provided with thermocouple units both in the heating jacket and inside the reaction space. The heating of the jacket was regulated so that the temperature of both the jacket and the polymerizing reaction mixture was kept equal. After a period of 30 minutes a temperature maximum of 203° C. was reached. Heating was then switched off; after cooling, the obtained polyamide block was easily extracted out of the mould. The content of lower molecular compounds amounted to 2.3%, polymerization degree of the product being equal to 730.

*Example 2*

1.8 g. of sodium salt of 6-caprolactam and 2.5 g. of tetraacetyl hexamethylenediamine were dissolved in 620 g. of molten 6-caprolactam preheated to a temperature of 150° C., and the mixture was transferred into an aluminium mould having a shape of gear-wheel (internal diameter 16 cm., height 8 cm., wall thickness 4 cm.). The mould was maintained at the same temperature as that of the polymerizing mixture. After completing the polymerization and cooling, the polyamide gear-wheel separated from the walls of the mould owing to the volume contraction of the polymer and could be easily extracted out of the mould.

*Example 3*

In a cylindrical vessel having a height of 25 cm. and an internal diameter of 8 cm., 0.3 g. of sodium salt 6-caprolactam and 0.5 g. of N-acetyl-6-caprolactam were dissolved in 120 g. of 6-caprolactam at a temperature of 180° C. An amount of 400 g. of powdered carborundum abrasive having a particle size of about 0.5 mm., preheated to a temperature of 220° C. was subsequently added to the mixture to be polymerized. In the course of the polymerization, the temperature of the mould was maintained at a value of 180° C. A steel shaft having a diameter of 10 mm. was situated concentrically in the middle of the vessel. After completing the polymerization process and cooling the product, a compact grinding wheel fixed on the shaft was extracted out of the mould.

What we claim is:

1. A method of forming by exothermic polymerization of 6-caprolactam a solid substantially void-free body of predetermined shape, comprising the steps of introducing into a heat insulated mold a reaction mixture consisting essentially of 6-caprolactam and an alkali metal salt of 6-caprolactam together with an N-alkylimide selected from the group consisting of acetylcaprolactam, caproylcaprolactam, diacetyl-ethylamine, dicaproyl butylamine, tetraacetylhexamethylenediamine and styrene-methacryloylcaprolactam copolymer as a polymerization catalyst for said 6-caprolactam so as to fill said mold with said reaction mixture, said reaction mixture being introduced into said heat insulated mold at a predetermined elevated temperature being sufficiently high to initiate polymerization of said 6-caprolactam and being at least 50° C. below the softening point of the polymerization product thereof so that during polymerization of said 6-caprolactam under adiabatic conditions the temperature of said reaction mixture will remain below said softening point despite increase of the temperature due to heat created by said polymerization; and maintaining said reaction mixture in said mold under substantially adiabatic conditions so as to substantially completely polymerize said 6-caprolactam in said mold without reaching an elevated temperature exceeding the softening point of the polymerized 6-caprolactam, whereby a solid body corresponding to the shape of said mold and consisting essentially of said polymerized 6-caprolactam, said body being substantially free of voids and internal stress, is formed in said mold.

2. A method of forming by exothermic polymerization of 6-caprolactam a solid, substantially void-free body of predetermined shape, comprising the steps of introducing into a heat insulated mold a reaction mixture consisting essentially of 6-caprolactam and an alkali metal salt of 6-caprolactam together with an N-alkylimide selected from the group consisting of acetylcaprolactam, caproylcaprolactam, diacetylethylamine, dicaproylbutylamine, tetraacetyl-hexamethylenediamine and styrene-methacryloylcaprolactam copolymer as a polymerization catalyst for said 6-caprolactam so as to fill said mold with said reaction mixture, said reaction mixture being introduced into said heat insulated mold at a predetermined elevated temperature being sufficiently high to initiate polymerization of said 6-caprolactam and being at least 50° C. below the softening point of the polymerization product thereof so that during polymerization of said 6-caprolactam under adiabatic conditions the temperature of said reaction mixture will remain below said softening point despite increase of the temperature due to heat created by said polymerization; and maintaining said reaction mixture in said mold under substantially adiabatic conditions, so as to substantially completely polymerize said 6-caprolactam in said mold without reaching an elevated temperature exceeding the softening point of the polymerized 6-caprolactam, whereby a solid body corresponding to the shape of said mold and consisting essentially of said polymerized 6-caprolactam, said body being substantially free of voids and internal stress, is formed in said mold.

3. A method of forming by exothermic polymerization of 6-caprolactam a solid, substantially void-free body of predetermined shape, comprising the steps of introducing into a heat insulated mold a reaction mixture consisting essentially of 6-caprolactam and an alkali metal salt of 6-caprolactam together with an N-alkylimide selected from the group consisting of acetylcaprolactam, caproylcaprolactam, diacetyl-ethylamine, dicaproyl butylamine, tetraacetylhexamethylenediamine and styrene-methacryloylcaprolactam copolymer as a polymerization catalyst for said 6-caprolactam so as to fill said mold with said reaction mixture, said reaction mixture being introduced into said heat insulated mold at a predetermined elevated temperature of between 95 and 215° C., said predetermined elevated temperature being sufficiently high to initiate polymerization of said 6-caprolactam and being at least 50° C. below the softening point of the polymerization product thereof so that during polymerization of said 6-caprolactam under adiabatic conditions the temperature of said reaction mixture will remain below said softening point despite increase of the temperature due to heat created by said polymerization; and maintaining said reaction mixture in said mold under substantially adiabatic conditions, so as to substantially completely polymerize said 6-caprolactam in said mold without reaching an elevated temperature exceeding the softening point of the polymerized 6-caprolactam, whereby a solid body corresponding to the shape of said mold and consisting essentially of said polymerized 6-caprolactam, said body being substantially free of voids and internal stress, is formed in said mold.

4. A method of forming by exothermic polymerization of 6-caprolactam a solid, substantially void-free body of predetermined shape, comprising the steps of introducing into a heat insulated mold a reaction mixture consisting essentially of 6-caprolactam, an inert filler and an alkali metal salt of 6-caprolactam together with an N-alkylimide selected from the group consisting of acetylcaprolactam, caproylcaprolactam, diacetylethylamine, dicaproylbutylamine, tetraacetyl-hexamethylenediamine and styrene-methacryloylcaprolactam copolymer as a polymerization catalyst for said 6-caprolactam so as to fill said mold with said reaction mixture, said reaction mixture being introduced into said heat insulated mold at a predetermined elevated temperature of between 95 and 215° C., said predetermined elevated temperature being sufficiently high to initiate polymerization of said 6-caprolactam and being at least 50° C. below the softening point of the polymerization product thereof so that during polymerization of said 6-caprolactam under adiabatic conditions the temperature of said reaction mixture will remain below said softening point despite increase of the temperature due to heat created by said polymerization; and maintaining said reaction mixture in said mold under substantially adiabatic conditions, so as to substantially completely polymerize said 6-caprolactam in said mold without reaching an elevated temperature exceeding the softening point of the polymerized 6-caprolactam, whereby a solid body corresponding to the shape of said mold and consisting essentially of said polymerized 6-caprolactam, said body being substantially free of voids and internal stress, is formed in said mold.

5. A method according to claim 4 wherein said mold is maintained at substantially the temperature of the reaction mixture within said mold.

References Cited by the Examiner
UNITED STATES PATENTS

| | | | |
|---|---|---|---|
| 2,246,086 | 6/41 | Austin | 260—37 |
| 2,907,755 | 10/59 | Tautenschlager et al. | 260—78 |
| 3,017,391 | 1/62 | Mottus et al. | 260—78 |
| 3,121,768 | 2/64 | Boyer | 260—78 |

OTHER REFERENCES

Sebenda et al.: Chemicke Listy, April 1958, pages 766–767 and 758–759.

WILLIAM H. SHORT, *Primary Examiner.*

A. M. BOETTCHER, MILTON STERMAN, LOUISE P. QUAST, *Examiners.*